(12) United States Patent
McLoone et al.

(10) Patent No.: US 6,883,984 B2
(45) Date of Patent: Apr. 26, 2005

(54) KEYBOARD WITH IMPROVED NUMERIC SECTION

(75) Inventors: Hugh E. McLoone, Bellevue, WA (US); James H. Cauthorn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 09/843,724

(22) Filed: Apr. 30, 2001

(65) Prior Publication Data

US 2002/0159811 A1 Oct. 31, 2002

(51) Int. Cl.$^7$ ................................................ B41J 5/08
(52) U.S. Cl. ........................ 400/486; 400/489; 400/477
(58) Field of Search ................................. 400/486, 489, 400/472, 473, 477, 480; 341/21–22, 26, 176; 345/168, 172; 434/227, 231, 232

(56) References Cited

U.S. PATENT DOCUMENTS

| | | | |
|---|---|---|---|
| 4,455,618 A | * | 6/1984 | Walden et al. ............... 708/144 |
| 4,974,183 A | | 11/1990 | Miller |
| 5,073,050 A | | 12/1991 | Andrews |
| 5,119,078 A | | 6/1992 | Grant |
| 5,129,747 A | | 7/1992 | Hutchison |
| 5,334,976 A | * | 8/1994 | Wang ........................... 341/22 |
| 5,360,280 A | | 11/1994 | Camacho et al. |
| 5,372,441 A | | 12/1994 | Louis |
| D362,432 S | | 9/1995 | Paull et al. |

(Continued)

FOREIGN PATENT DOCUMENTS

| | | |
|---|---|---|
| EP | 0 863 456 A1 | 9/1998 |
| WO | WO 97/27529 | 7/1997 |

OTHER PUBLICATIONS

Olsson; Computer keyboard has number pad with its own tab key and preferably with extra shift key and space bar; Oct. 9, 2000; SE 9903443A.*

IBM Corp., *Input Device fir OS/2*, IBM Technical Disclosure Bulletin, vol.. (unknown), No. 11, Apr. 1991, 1 sheet, p. 255.

Lifestyle Magazine, Design article, *Typing Without Keys, An Epidemic of injuries among office workers prompts a search for a better keyboard*, 2 sheets, (date of article unknown, but prior to filing of this application).

(Continued)

*Primary Examiner*—Minh Chau
(74) *Attorney, Agent, or Firm*—Banner & Witcoff, Ltd.

(57) ABSTRACT

A keyboard having an improved numeric section and an improved numeric key cluster in the numeric section. The keyboard preferably includes an alphanumeric or QWERTY section and an editing section laterally disposed from the numeric section. A row of function keys is preferably provided above at least the numeric key cluster. The present invention also provides keys frequently used with the numeric section within, or in close proximity to, the key cluster in the numeric section. A Tab key or an Equals "=" key has been provided within the key cluster for improved efficiency. Additionally, a row, preferably including four keys, is provided above and in close proximity to the numeric key cluster. These keys preferably include a Left Parenthesis "(" key, a Right Parenthesis ")" key, a Backspace key, and a Tab key or an Equals "=" key, whichever is not provided within the numeric key cluster. The keyboard does not include a specifically labeled NumLock key within the numeric key cluster. The keys provided in the numeric key cluster and in its proximity are frequently used with digit keys and enhances the effectiveness of the numeric key cluster when it is being used for many program applications and alleviates the problem of having to reach over number pad or use the other hard to acquire keys in the alphanumeric section of the keyboard.

16 Claims, 4 Drawing Sheets

U.S. PATENT DOCUMENTS

| | | | | |
|---|---|---|---|---|
| 5,476,332 A | * | 12/1995 | Cleveland, Jr. | 480/486 |
| D386,169 S | | 11/1997 | Wang | |
| 5,790,103 A | * | 8/1998 | Willner | 345/168 |
| D410,454 S | | 6/1999 | Chen | |
| D417,210 S | | 11/1999 | Prokop | |
| D428,613 S | | 7/2000 | Chen | |
| D428,889 S | | 8/2000 | Chen | |
| 6,098,086 A | * | 8/2000 | Krueger et al. | 707/535 |
| 6,111,527 A | * | 8/2000 | Susel | 341/22 |
| 6,142,687 A | * | 11/2000 | Lisak | 400/472 |
| 6,241,406 B1 | * | 6/2001 | Yan | 400/489 |

OTHER PUBLICATIONS

Ergnomixx, MyKey, *The Shape of Comfort*, (date unknown, but prior to filing of this application), 1 sheet.

Forbes, Computers/Communications, article, *My aching hands!*, Dec. 20, 1993, 1 sheet, p. 246.

ISO/IEC 9995–1 International Standard, *information technology—Keyboard layouts for text and office systems—Part 1: General principles governing keyboard layouts*, 16 pages, First edition, Aug. 15, 1994.

ISO/IEC 9995–2 International Standard, *information technology—Keyboard layouts for text and office systems—Part 2: Alphanumeric section*, 11 pages, First edition, Aug. 15, 1994.

ISO/IEC 9995–3 International Standard, *information technology—Keyboard layouts for text and office systems—Part 3: Complementary layouts of the alphanumeric zone of the alphanumeric section*, 9 pages, First edition, Aug. 15, 1994.

ISO/IEC 9995–4 International Standard, *information technology—Keyboard layouts for text and office systems—Part 4: Numeric section*, 11 pages, First edition, Aug. 15, 1994.

ISO/IEC 9995–5 International Standard, *information technology—Keyboard layouts for text and office systems—Part 5: Editing section*, 11 pages, First edition, Aug. 15, 1994.

ISO/IEC 9995–6 International Standard, *information technology—Keyboard layouts for text and office systems—Part 6: Function Section*, 6 pages, First edition, Aug. 15, 1994.

ISO/IEC 9995–8 International Standard, *information technology—Keyboard layouts for text and office systems—Part 8:Allocation of letters to the keys of a numeric keypad*, 7 pages, First edition, Aug. 15, 1994.

* cited by examiner

KEYBOARD WITH IMPROVED NUMERIC SECTION

CROSS REFERENCE TO RELATED APPLICATIONS

This application is related to U.S. patent application Ser. No. 09/843,799, entitled Keyboard with Improved Function and Editing Sections, U.S. patent application Ser. No. 09/843,723, entitled Keyboard with Improved Lateral Region, and U.S. patent application Ser. No. 09/843,794 entitled Input Device Including a Wheel Assembly for Scrolling an Image in Multiple Directions, all of which have been filed simultaneously herewith and are commonly assigned with the present application. These applications are hereby incorporated by reference.

FIELD OF THE INVENTION

The present invention generally relates to keyboards for entering data into text and office systems such as computers. More specifically, the present invention relates to a keyboard having an improved numeric section and function section in the region of the numeric section.

BACKGROUND OF THE INVENTION

Figure 1:
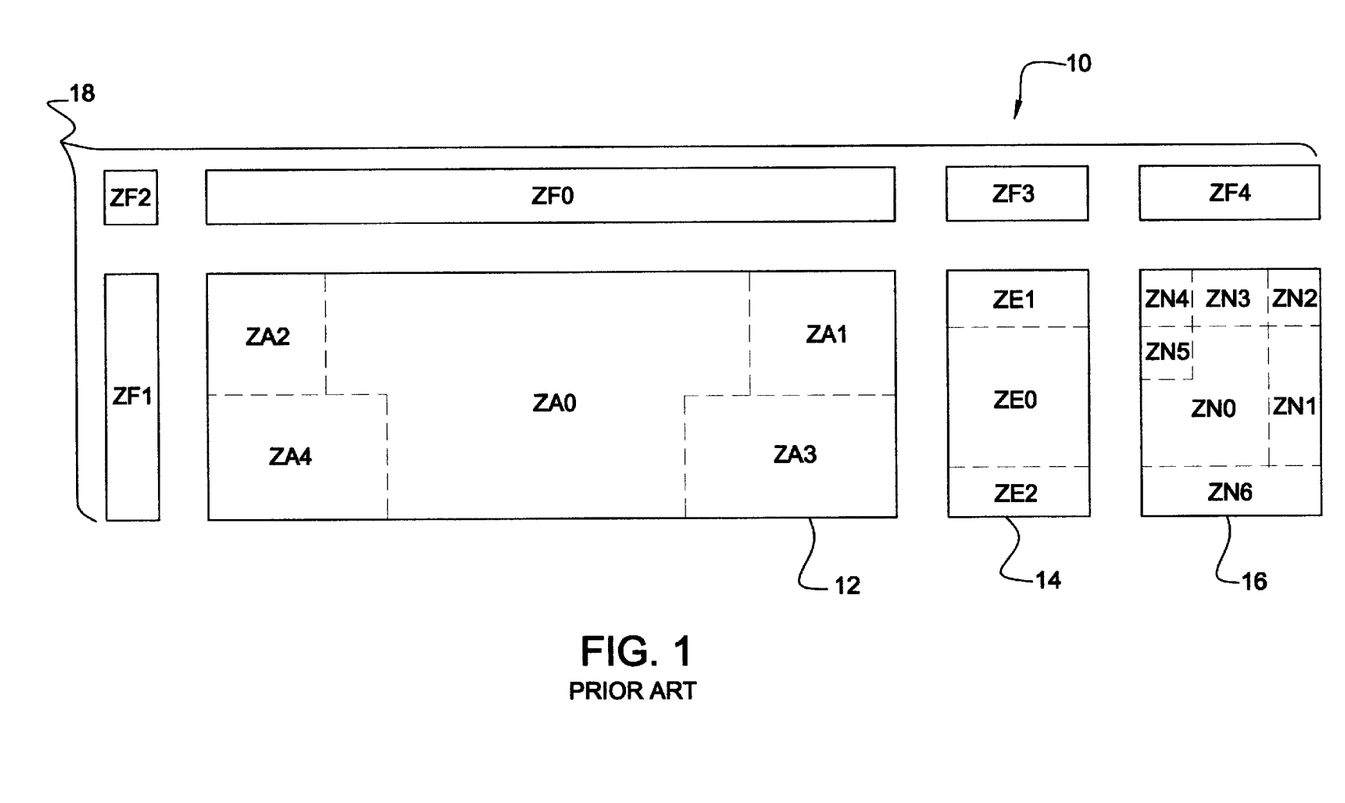
FIG. 1 is a schematic plan view showing the zones of various keyboard regions as set forth in the International Standard ISO/IEC 9995-1.

While there are many different keyboard designs, the general layout for many keyboards for text and office systems follows the International Standard ISO/IEC 9995-1. This standard layout is shown in FIG. 1. A standard keyboard 10 layout includes an alphanumeric section 12, an editing section 14, a numeric section 16, and a function section 18. The alphanumeric section 12, sometimes referred to as the "QWERTY" section, typically includes keys for each of the letters of the alphabet, the digits 0–9, and various punctuation symbols, and occupies zones ZA0 to ZA4. The editing section 14, located to the right of the alphanumeric section 12, typically includes four arrow keys for controlling the cursor, and Insert, Delete, Home, End, PageUp, and PageDown keys, and occupies zones ZE0 to ZE2. The numeric section 16 is located to the right of the editing section 14, typically includes keys for each of the digits 0–9 and arithmetic operation symbol keys and occupies zones ZN0 to ZN6. The function section 18 includes function keys and may be located in one or more of the zones ZF0 to ZF4. As shown in FIG. 1, zones ZF0, ZF3, and ZF4 are above alphanumeric section 12, editing section 14, and numeric section 16, respectively, and zone ZF1 is located to the left of alphanumeric section 12. Zone ZF2 is located diagonally, to the left and above, alphanumeric section 12. Computer keyboards commonly use the zone ZF4 immediately above the numeric section 16 to provide light emitting diodes (LEDs) indicative of the state of various keys, such as NumLock, CapsLock, and ScrollLock.

Figure 2:
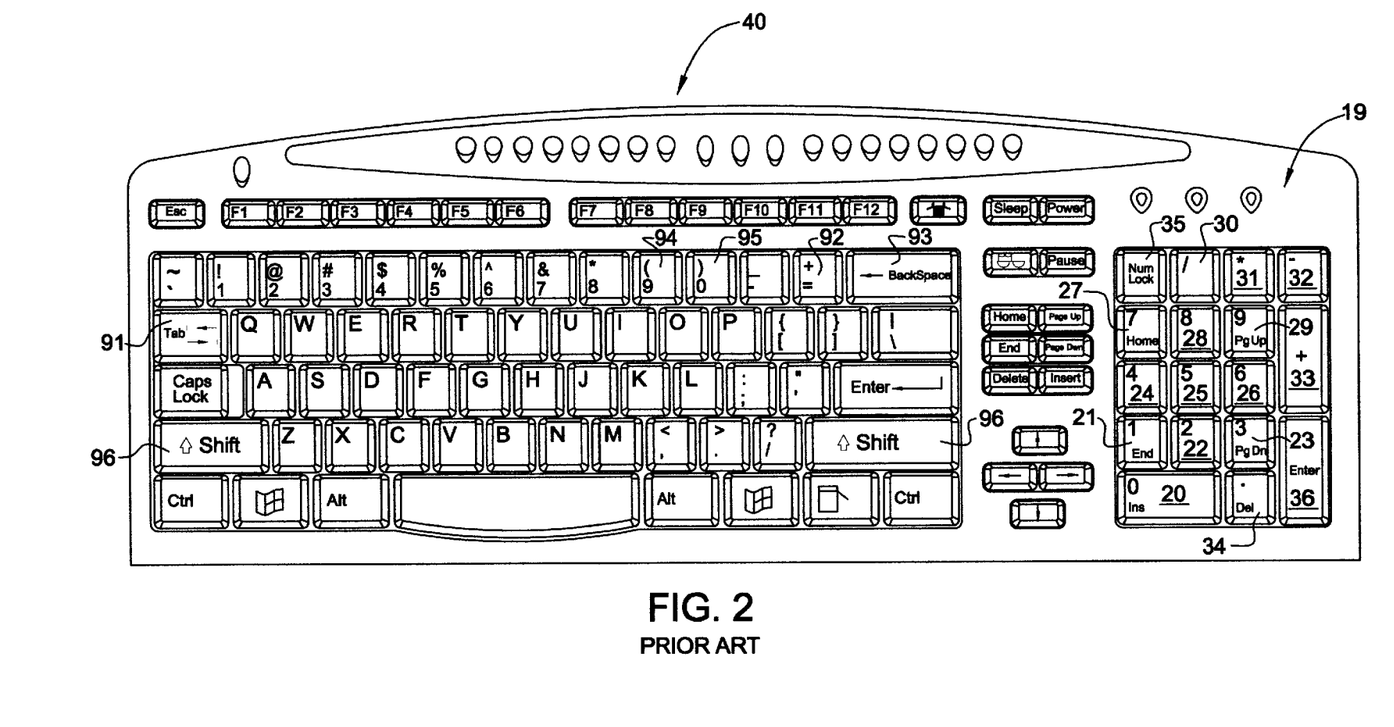
FIG. 2 is a plan view of a prior art keyboard illustrating its numeric section.

A conventional key configuration for a numeric section 19 is shown on a keyboard 40 in FIG. 2. The numeric section 19 includes Digit 0–9 keys, respectively designated by reference numerals 20–29, arithmetic operation keys including a Divide "/" key 30, a Multiply "*" key 31, a Subtract "−" key 32, and an Addition "+" key 33, a Decimal Separator key 34, a NumLock key, 35, and an Enter key 36. The Digit 1–9 keys 21–29 are organized in a three-by-three array. The Digit 0 key 20 and the Decimal Separator key 34 are disposed below that array. The arithmetic operation keys 30–33 are disposed above and to the right of the array of the Digit 1–9 keys 21–29. The NumLock key 35 is positioned in the upper left corner of the numeric section 19 above the Digit 7 key 27. The Enter key 36 is positioned in the bottom right corner of the numeric section 19 to the right of the Decimal Separator key 34 and the Digit 3 key 23. A common variation to this configuration includes switching the Digit 1, Digit 2 and Digit 3 keys 21–23 with the Digit 7, Digit 8, and Digit 9 keys 27–29 so that the Digit keys 21–29 resemble a telephone key number system rather than a calculator key number system.

The numeric section 19 on the keyboard 40 is typically utilized in many different types of applications where the data entry of numbers is a frequent occurrence. Some examples of such applications include accounting programs, tax programs, spreadsheets, databases, and e-commerce programs on websites. However, the existing numeric sections 19, and their lack of convenient one-handed key access for certain keys, have inherent drawbacks that limit their effectiveness.

One such drawback is that the commonly used numeric section 19 fails to normally include a Tab key within the numeric section 19 or in its proximity, even though the Tab key is frequently used with the digit keys 20–29 of the numeric section 19 for the applications described above. For example, in a spreadsheet application, a user frequently will enter numbers into cells while "tabbing" between each cell. Thus, for prior art keyboards 40 with a numeric section 19 as shown, the user is required to reach into the alphanumeric section 12 to input a "Tab". This requires the user to use his or her other hand, which may be occupied with another input device such as a mouse, or to move his or her hand from the numeric section 16 to the alphanumeric section 12 to acquire the Tab key 91. Both alternatives are inefficient from a data entry standpoint and make the experience of the user more frustrating. This is especially true where the user must make repetitive entries of numeric data for a long period of time.

The Backspace key 93, the Equals "=" key 92, the Digit 9 key 94 and a Shift key 96 to enter a Left Parenthesis "(", and the Digit 0 key 95 and a Shaft key 96 to enter a Right Parenthesis ")" are also frequently used with the digit keys 20–29 of the numeric section 19 for the applications described above. However, the numeric section 19 fails to include such keys within the numeric section 19 or even in its proximity. Thus, for prior art keyboards with numeric sections 19 as shown, the user is frequently required to reach into the alphanumeric section 12 to use the Backspace key 93 or the Equals key 92 to input these characters. As described above, this requires the user to use his or her other hand, which may be occupied with another input device such as a mouse, or to move his or her hand from the numeric section 19 to the alphanumeric section 12 to acquire these keys 93 and 92. Further, to produce a left parenthesis "(" or a right parenthesis ")" the user must use his or her other hand, which may be occupied with another input device such as a mouse, or move his or her hand from the numeric section 19 to the alphanumeric section 12 to acquire the Digit 9 key 94 simultaneously with the Shift key 96, or the Digit 0 key 95 simultaneously with the Shift key 96. Accordingly, this numeric section 19 and the surrounding region include limitations that frequently disrupt the data entry process. These limitations are magnified when the keyboard is used by a segment of the population who may be amputees or have less than full use or their arms and fingers.

Additionally, this commonly-used numeric section 19 includes a NumLock key 35 that is rarely used and is engaged by accident more often than intentionally. The unintended pressing of the NumLock key 35 can cause significant inefficiencies. Accidentally pressing the NumLock key 35 changes the effect of depressing the digit keys 20–29 from a digit key function to an editing and cursor control function. More specifically, many of the digit keys are changed to have the effect of cursor control arrow keys, or PageUp, PageDown, Home, and End keys. Usually, the user does not become aware of an accidental contact with the NumLock key 35 until after additional data has been entered, which further increases the inefficiency associated with the NumLock key 35 in prior art keyboards. Additionally, some users do not realize that having the NumLock "off" results in the loss of the primary functionality of the numeric section 19. Thus, the inclusion of the Numlock key 35 is a drawback.

Accordingly, a more convenient keyboard having an improved numeric section and/or surrounding keys was thus needed.

SUMMARY OF THE INVENTION

An aspect of the present invention provides a keyboard having an improved numeric section and/or an improved numeric key cluster in the numeric section. Keys frequently used with the numeric section may be provided within, or in close proximity to, the key cluster in the numeric section.

For example, a Tab key or an Equals "=" key may be provided within the numeric key cluster for improved efficiency. Additionally, a row, preferably including four keys, may be provided above and in close proximity to the numeric key cluster. These keys preferably include a Left Parenthesis "(" key, a Right Parenthesis ")" key, a Backspace key, and a Tab key or an Equals "=" key, whichever is not provided within the numeric key cluster. Such a configuration solves the problem of having to reach over numeric pad or use the other hand to acquire keys in the alphanumeric section of the keyboard. The NumLock key, which is normally included in the numeric section of prior art keyboards, is preferably excluded from the numeric key cluster, or at least excluded in that it does not include a primarily labeled NumLock key.

An aspect of the present invention provides an improved keyboard including a number pad. The number pad has a plurality of digit keys, a plurality of arithmetic operation keys, and a Tab key.

In another aspect, the present invention includes a keyboard having an alphanumeric section, a numeric section, a group of keys in the numeric section, a Tab key, and an Equals key. The group of keys in the numeric section includes a plurality of digit keys and a plurality of arithmetic operation keys. At least one of either the Tab key or the Equals key is located within one inch of a key in the numeric section.

An aspect of the present invention includes a keyboard having an alphanumeric section, a numeric section, a group of keys in the numeric section, and a Backspace key. The group of keys in the numeric key includes a plurality of digit keys and a plurality of arithmetic operation keys. The Backspace key is located within one inch of a key in the numeric section.

DETAILED DESCRIPTION OF THE INVENTION

As a preface to this section, a few terms are defined.

A "number pad," as used herein, is defined as the group of keys occupying a numeric section of a keyboard separate from an alphanumeric section or as described in the background, shown in FIG. 1, and set forth in International Standard ISO/IEC 9995-1, which is hereby incorporated by reference in its entirety.

A "key cluster" is defined as a group of keys, each of which is immediately adjacent, or in close proximity, to adjacent keys within the cluster and set apart from other keys on the keyboard by a distance larger than the spacing between the adjacent keys in the cluster.

A key is "labeled" as a certain type of key when it includes indicia thereon or immediately adjacent thereto corresponding to the image to be provided or associated function to be performed when that key is pressed. A key may be "primarily labeled," and may further be "secondarily labeled." For example, when activated or depressed alone, the digit 7 key may cause a symbol of the numeral 7 to be imaged. In another example, when activated or depressed alone, the Tab key may provide a Tab command function to be executed.

If a key has only one indicia thereon or immediately adjacent thereto, it is "primarily labeled" as to the image to be provided and/or the associated function to be performed when that key is pressed. A key having multiple distinct indicia thereon is both "primarily labeled" and "secondarily labeled." That key is "primarily labeled" as a certain key when it has indicia corresponding to the image to be displayed and/or function to be performed that is more visually apparent or dominant with respect to any other indicia of that key. That key is "secondarily labeled" as a certain key when it has indicia corresponding to the image to be displayed and/or associated function to be performed is less visually apparent with respect to other indicia of that key. Indicia may be dominant or more visually apparent relative to other indicia of the key based on its position on or relative to the key, the color contrast of the indicia relative to the key, the size of the indicia, or any other technique known for accentuating or de-accentuating indicia relative to each other. For example, a key having an upper surface and a smaller visible front face surface as viewed during normal usage, with indicia on both surfaces, would be primarily labeled with the indicia on the upper surface and secondarily labeled with the second indicia on the smaller front surface. Similarly, a key that is colored black, having a first indicia printed thereon that is white and a second indicia printed thereon that is red, would be primarily labeled corresponding to the first indicia and secondarily labeled corresponding to the second indicia as a white-on-black contrast would make the first indicia more apparent than the red-on-black contrast of the second indicia.

Figure 3:
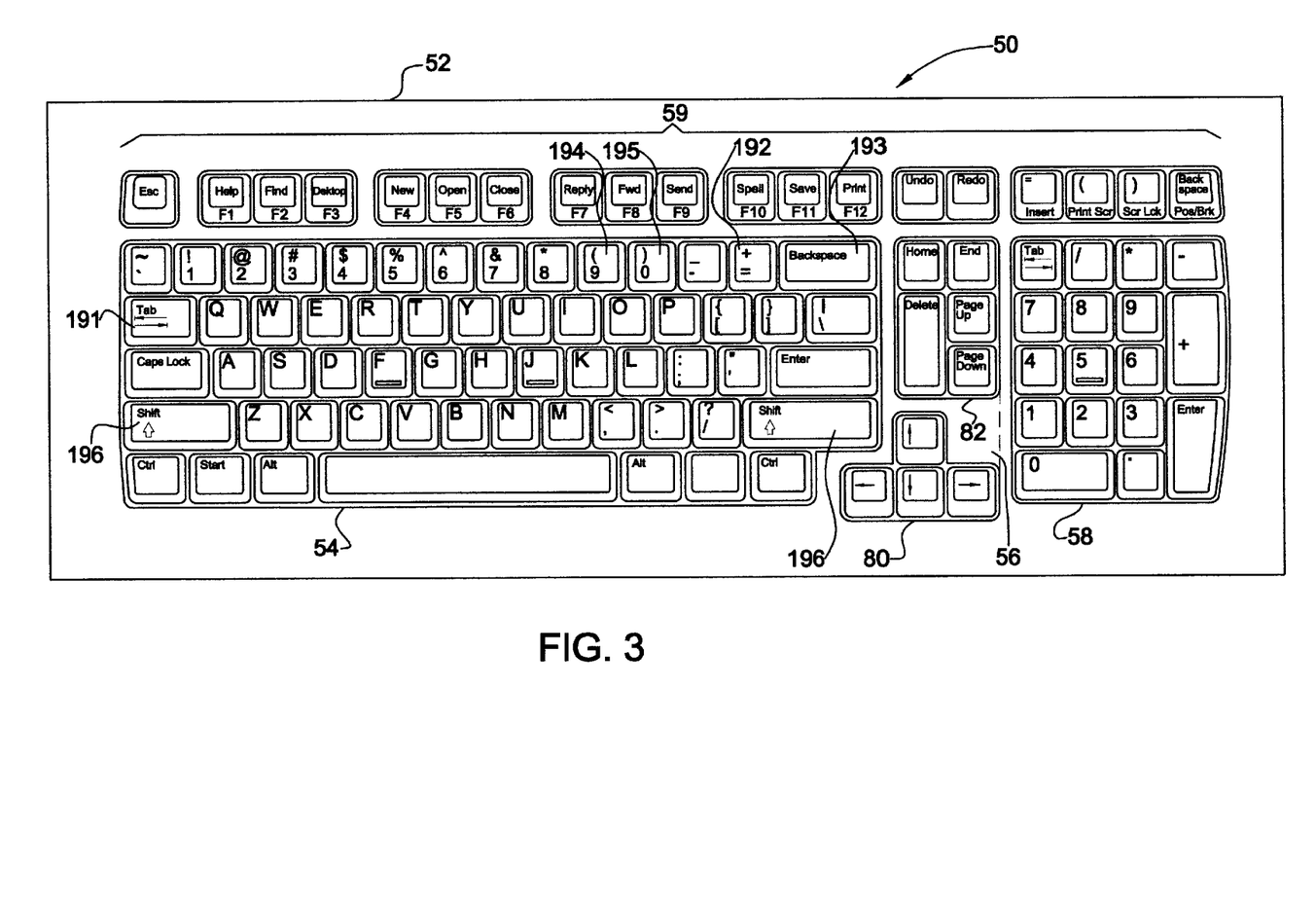
FIG. 3 is a schematic plan view of an exemplary keyboard according to one or more aspects of the present invention.
Figure 4:
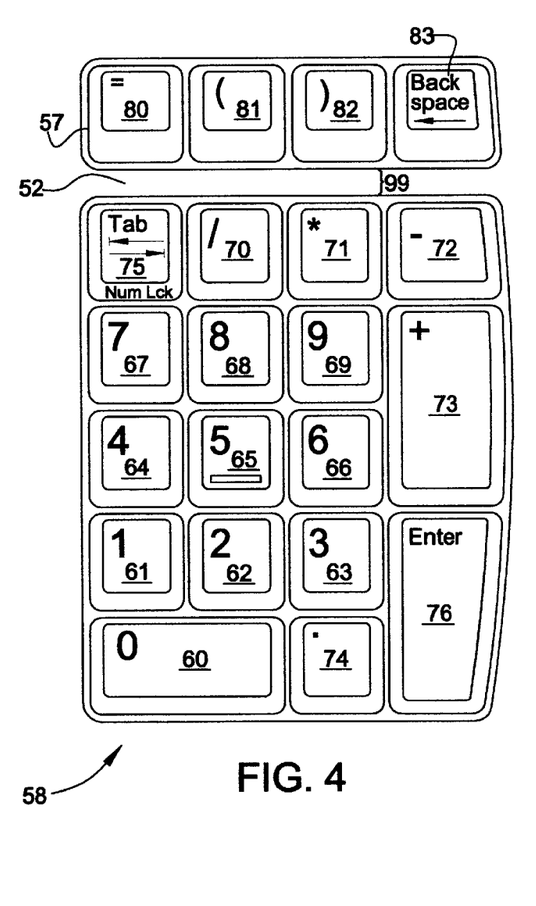
FIG. 4 is an enlarged schematic plan view of the numeric section and adjacent function keys of the keyboard of FIG. 3.
Figure 5:
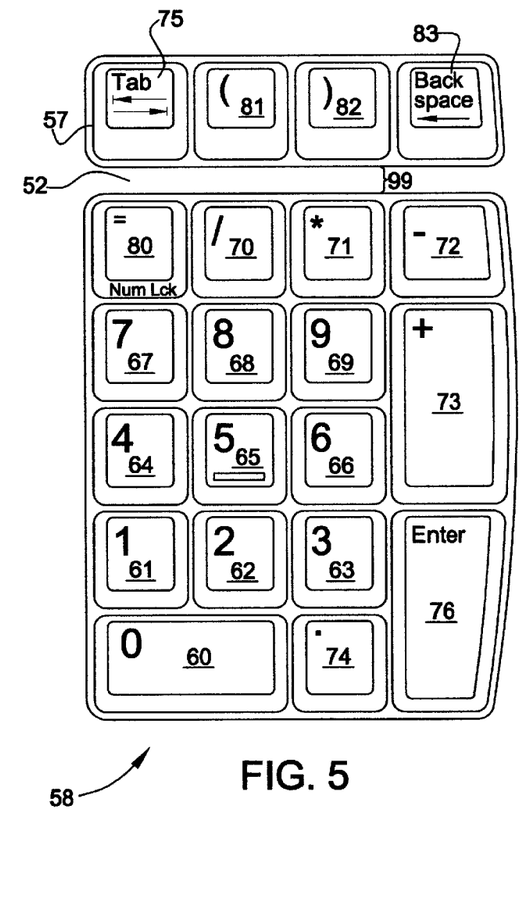
FIG. 5 is an enlarged schematic plan view, similar to FIG. 4, showing a variation of the numeric section and adjacent function keys.

Exemplary keyboard designs in accordance with one or more aspects of the present invention are shown in FIGS. 3–5 and designated by reference numeral 50. Referring to FIG. 3, the keyboard 50 includes an alphanumeric section 54, an editing section 56, a numeric section 58, and a function section 59. For reference purposes, the keyboard 50 has a front edge 116 adjacent the user during normal use, and a back edge 117 distal from the user during normal use. Accordingly, an object is said herein to be "behind" another object when it is between that object and the back edge 117. An object is said herein to be "directly behind" another object when it is between that object and the back edge 117 and at least partially located within the lateral bounds of that object extending in the front-to-back direction. An object is said herein to be "entirely directly behind" another object when it is between that object and the back edge 117 and entirely located within the lateral bounds of that object extending in the front-to-back direction. An object is said herein to be "in front of" another object when it is between that object and the front edge 116. Further, the keyboard 50 also has left and right edges 118 and 119. The direction "lateral" defines the general directions from the left edge 118 to the right edge 119 and from the right edge 119 to the left edge 118.

The alphanumeric section 54, sometimes referred to as the QWERTY section, includes keys for each of the letters of the alphabet, each of the digits 0–9, and various punctuation symbols. The editing section 56, preferably located immediately to the right of the alphanumeric section 54, preferably includes four cursor control arrow keys 80, and Delete, Home, End, PageUp, and PageDown keys 82. The numeric section 58, is preferably to the right of the editing section 56. The function section 59 preferably includes a horizontal row of keys above the alphanumeric section 54, editing section 56, and numeric section 58. In a preferred arrangement, thirteen function keys are located above the alphanumeric section 54 and preferably grouped and labeled for their function as shown.

Referring to FIG. 4, the numeric section 58 includes a number pad that is formed in this example by a key cluster. The key cluster contains Digit 0–9 keys 60–69; arithmetic operation keys 70–73 including a Divide "/" key 70, a Multiply "*" key 71, a Subtract "–" key 72, and an Addition "+" key 73; a Decimal Separator key 74; a Tab key, 75; and/or an Enter key 76. The Digit 1–9 keys 61–69, are organized in a three-by-three array. Digit 0 key 60 and the Decimal Separator key 74 are disposed below that array. The arithmetic operation keys 70–73 are disposed above and to the right of the array of digit keys, 61–69. The Tab key 75 is positioned in the upper left corner of the numeric section 58 above the Digit 7 key 67. The Enter key 76 is positioned in the bottom right corner of the numeric section 58 to the right of the Decimal Separator key 74 and the Digit 3 key 63.

The Tab key 75 is preferably located in the numeric section 58 where the NumLock key 35 normally resides in many conventional keyboards. That is, the Tab key 75 is in the upper left corner of the key cluster in the numeric section 58. The Tab key is commonly used during accounting, spreadsheet, and form filing tasks such as e-commerce activities on the web. In these types of applications, where number entry is common, activating the Tab key 75 enables the user to move into different fields or cells between numerical data field entries. The Tab key 75 in its location in the numeric section 58 eliminates drawbacks of conventional keyboards such as having to use a mouse to switch cells or fields, or the need to awkwardly and inefficiently locate and depress the Tab key 91, 191 on the QWERTY or alphanumeric section 54. Accordingly, in use, the user can activate all of the digit keys 60–69, the arithmetic operation keys 70–73, the Tab key 75, and the other keys 74 and 76 in the numeric section 58 efficiently with one hand.

As shown in FIG. 4, the keyboard 50 also preferably adds keys 80–83 for commonly performed actions above the number pad 58 of the keyboard 50. The added keys 80–83 are preferably the Equals "=" key 80, the Left Parenthesis "(" key 81, the Right Parenthesis ")" key 82, and the Backspace key 83. These keys 80–83 are preferably positioned in a single horizontal row 57 in the function section 59 above the numeric section 58, in zone ZF4 of FIG. 1. These keys 80–83 are all commonly used during accounting and spreadsheet tasks. Although the order of the keys 80–83 is preferably as shown in the figures, it is recognized that they can be in any order within the row. Further, the keys 80–83 are preferably located within the natural finger extension range of the common user when he or she is using the numerical section 58. Accordingly, the row 57 of keys 80–83 is preferably separated by a gap 99 that is less than or equal to 1 inch, ½ inch, or ¼ inch from the top row of keys 70–72 and 75 in the key cluster. In a first arrangement as shown, the gap 99 on the housing 52 between the horizontal row 57 and the top row of keys 70–72 and 75 is preferably 6 mm. However, the present invention includes arrangements with gaps greater and smaller than 6 mm., including an arrangement, not shown, where there is no gap separating the rows of keys except for the normal spacing that occurs between keys within the same cluster.

The presence of the keys 80–83 frequently used with the keys in the numeric section 58 increases the effectiveness of the keyboard 50. To produce an "=" symbol or delete the previous space without such keys 80–83, the user would conventionally have had to awkwardly and inefficiently locate the Equals key 92, 192 and the Backspace key 93, 193. With the current numeric key cluster 58 and its adjacent and proximate row of keys 57, the user merely extends a finger while using the number pad 58. This arrangement is particularly advantageous when the keyboard 50 is used by a segment of the population who may be have less than full use or two arms and ten fingers.

For the conventional keyboard arrangements, the inefficiencies are even worse for the Left Parenthesis key 94, 194 and the Right Parenthesis key 95, 195. To produce a "(" or ")" character using a prior art keyboard, such as the one in FIG. 2, the user would have to awkwardly take time to locate the Digit 9 key 94, 194 and the Digit 0 key 95, 195, and simultaneously locate and activate a Shift key 96, 196 to change the function of the Digit 9 key 94, 194 and the Digit 0 key 95, 195. In the present invention, acquiring the Left Parenthesis key 81 and Right Parenthesis key 82 is accomplished in a faster and more efficient manner by merely extending a finger when using the number pad 58.

FIG. 5 shows an alternative embodiment to that shown in FIG. 4. In this arrangement, the locations of the Equals key 80 and the Tab key 75 have been swapped. Accordingly, in this design, the Tab key 75 is on function key row 57 with the Left Parenthesis key 81, the Right Parenthesis key 82, and the Backspace key 83. The Equals key 80 is in the numeric section 58 on the row with certain arithmetic operation keys 70–72. This alternative key arrangement is advantageous since it also positions keys frequently used with the digit keys in or closely proximate to the numeric section 58 within the normal finger reach of the user. Although the keys 75, 81, 82, 83 may preferably be ordered as shown in the FIG. 5, it is recognized that they can be in any order within the row 57.

In addition to the increased functionality of the key arrangements as described for both the FIG. 4 and FIG. 5 embodiments, the NumLock key preferably does not exist in the key cluster in the numeric section 58. This omission provides an improved keyboard 50 as the existence of a NumLock key in the numeric section in and of itself is a drawback. However, if desired, a function lock key, not shown, may be positioned along the top edge of the keyboard 50 or in any other desirable location on the keyboard. If provided, and activated, the function lock key would convert the Tab key 75 to behave as a NumLock key when the function lock was in a particular mode. If desired, the Tab key 75 may be secondarily labeled, such as on its front side surface, by the use of NumLock, or a similar label, to provide guidance to the user that that key 75 can be a NumLock key in a different mode. However, the key 75 is primarily labeled on its top surface as a Tab Key 75 and not a NumLock key.

In another variation to the configurations in FIGS. 4 and 5, a key arrangement may be provided where the Digit 1, Digit 2 and Digit 3 keys 61–63 are switched with the Digit 7, Digit 8, and Digit 9 keys 67–69 so that the digit keys more resemble a telephone key number system rather than a calculator key number system.

It is recognized that in use, the keyboard would preferably be coupled to a system, such as, but not necessarily, a processor and software to run the application programs. The keys for the keyboard 50 may be operable to provide the desired commands to the system according to any known arrangement such as the generation of an electrical signal indicative of the character, symbol, or command associated with that key. Additionally, while the keys as shown are preferably of standard size and shape for computer keyboards, it is recognized that any or all of the keys may be alternative sized and/or shaped. For example, some or all of the keys may be oval shaped.

While particular embodiments of the invention have been shown and described, it is recognized that various modifications thereof will occur to those skilled in the art. For example, The Left Parenthesis and Right Parenthesis keys 81 and 82 may instead be Clear and Clear Entry function keys, which are commonly used in accounting applications. It is also recognized that all or part of the features of this keyboard 50 may be used with all or part of the keyboard features as described in U.S. patent application Ser. No. 09/843,799, entitled Keyboard with Improved Function and Editing Sections and U.S. patent application Ser. No. 09/843,723, which have been incorporated by reference herein. Therefore, the scope of the herein-described invention shall be limited solely by the claims appended hereto.

What is claimed is:

1. A keyboard comprising: a number pad, said number pad having a first key cluster including a plurality of digit keys, a plurality of arithmetic operation keys, and a Tab key, said keyboard having a second key cluster including at least a Backspace key, a Left Parenthesis key and a Right Parenthesis key, said second key cluster being directly behind said first key cluster and being spaced within one inch of said first key cluster.

2. The keyboard of claim 1, wherein said first key cluster further includes a Decimal Separator key and an Enter key.

3. The keyboard of claim 2, wherein said plurality of digit keys includes a Digit 1 key, a Digit 2 key, a Digit 3 key, a Digit 4 key, a Digit 5 key, a Digit 6 key, a Digit 7 key, a Digit 8 key, a Digit 9 key, and a Digit 0 key, said Digit 1–9 keys being configured in a three-by three array.

4. The keyboard of claim 1, further comprising an Equals key, said Equals key being located in said second key cluster.

5. The keyboard of claim 1, wherein said first key cluster includes a secondarily labeled NumLock key.

6. A keyboard comprising:
a number pad, said number pad having a plurality of digit keys, a plurality of arithmetic operation keys, and a Tab key, wherein said plurality of digit keys, said plurality of arithmetic operation keys, and said Tab key are part of a key cluster; wherein said key cluster further includes a Decimal Separator key and an Enter key and a secondary mode Numlock Key; wherein the total number of keys in the key cluster is between 16 and 19.

7. A keyboard comprising:
an alphanumeric section;
a numeric section having a group of keys including a plurality of digit keys and a plurality of arithmetic operation keys; said numeric section including a Tab key; and an Equals key;
wherein said one of said Tab key and said Equals key is disposed in a single key cluster spaced behind a digit key and the other of said Tab key and said Equals key is a secondarily labeled NumLock key.

8. The keyboard of claim 7, wherein said Equals key is located within said single key cluster.

9. The keyboard of claim 7, wherein said Tab key is located within said single key cluster.

10. The keyboard of claim 7, further comprising a Left Parenthesis key, a Right Parenthesis key, and a Backspace key, wherein each of said Left Parenthesis key, said Right Parenthesis key, and said Backspace key is located within said single key cluster.

11. The keyboard of claim 10, wherein said single key cluster is disposed in a horizontal row.

12. The keyboard of claim 11, further comprising an editing section, wherein said editing section is laterally disposed between said alphanumeric and numeric sections.

13. A computer keyboard comprising: an alphanumeric section, a numeric section, a group of keys in the numeric section, said group of keys in the numeric section having a plurality of digit keys and a plurality of arithmetic operation keys, and a secondarily labeled NumLock key.

14. The keyboard in accordance with claim 13, wherein said key which is a secondarily labeled NumLock key is a primarily labeled Tab key.

15. The keyboard in accordance with claim 14, further including an editing section laterally disposed between said alphanumeric section and said numeric section.

16. The keyboard in accordance with claim 15, further comprising a Left Parenthesis Key, a Right Parenthesis Key, and a Backspace Key; wherein said Left Parenthesis Key, said Right Parenthesis Key, and said Backspace Key reside in a single horizontal row spaced one inch from said group of keys.

* * * * *

UNITED STATES PATENT AND TRADEMARK OFFICE
CERTIFICATE OF CORRECTION

PATENT NO. : 6,883,984 B2
APPLICATION NO. : 09/843724
DATED : April 26, 2005
INVENTOR(S) : McLoone et al.

Page 1 of 1

It is certified that error appears in the above-identified patent and that said Letters Patent is hereby corrected as shown below:

On the title page, item (75), in "Inventors", in column 1, line 3, after "(US)" insert -- ; William H. Vong, Seattle, WA (US) --.

On the title page, item (56), under "Other Publications" in column 2, line 5, after "vol." delete ".".

In column 1, line 59, delete ""-"" insert -- "-", --, therefor.

In column 3, line 12, delete "Numlock" and insert -- NumLock --, therefor.

In column 6, line 2, delete ""="" and insert -- "=", --, therefor.

In column 6, line 3, delete ""("key 81" and insert -- "(" key 81, --, therefor.

In column 8, line 2, in Claim 3, delete "three-by three" and insert -- three-by-three --, therefor.

In column 8, line 14, in Claim 6, delete "Numlock" and insert -- NumLock --, therefor.

Signed and Sealed this

Ninth Day of June, 2009

JOHN DOLL
*Acting Director of the United States Patent and Trademark Office*